Aug. 15, 1933.  J. MULDER  1,922,318
AIR COOLED BRAKE
Filed Sept. 3, 1929
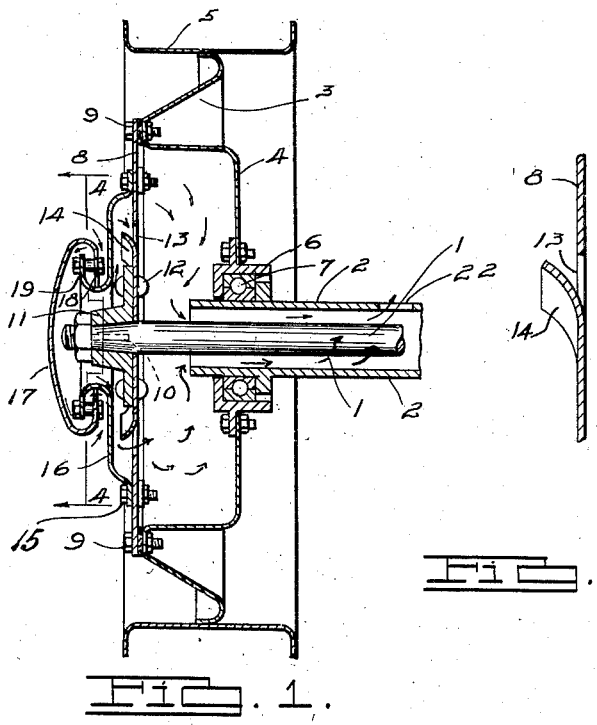
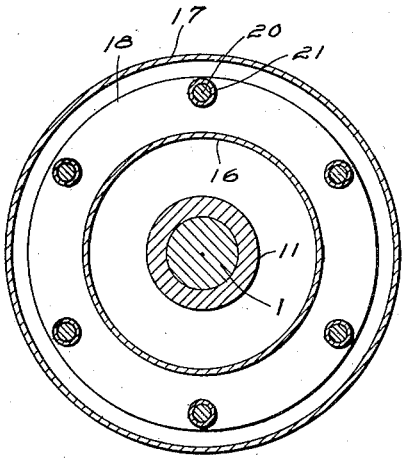
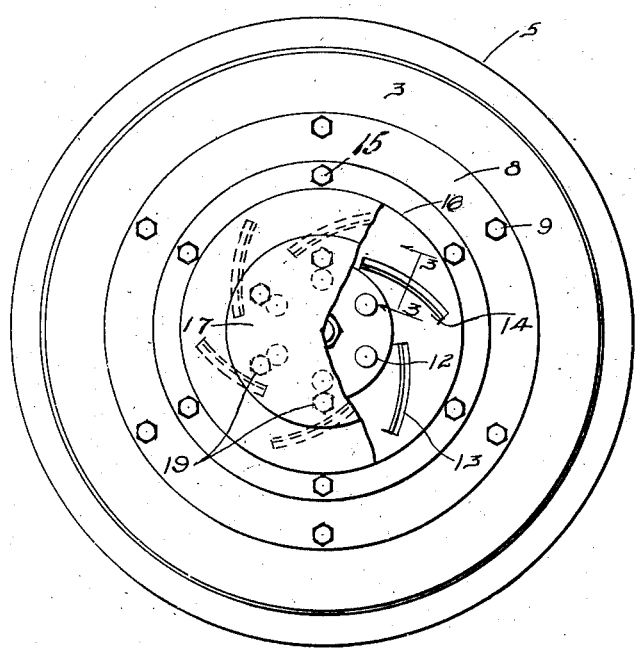
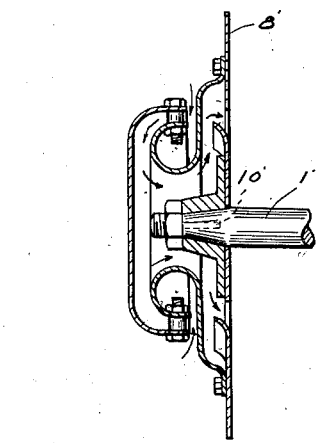
INVENTOR
Jentje Mulder
BY
ATTORNEY Patented Aug. 15, 1933

1,922,318

UNITED STATES PATENT OFFICE 1,922,318

AIR COOLED BRAKE

Jentje Mulder, Detroit, Mich.

Application September 3, 1929. Serial No. 390,061

7 Claims. (Cl. 188—264)

This invention relates to vehicle wheel brakes, and particularly to brakes comprising a drum, and means for inducing a cooling flow of air adjacent to the drum.

An object of the invention is to provide a rotative wall of a brake drum with air admission openings and to provide upon said wall adjacent to said openings vanes or louvers for deflecting air into and through the drum as the latter rotates.

Another object is to form the main body of a brake drum as an integral portion of a disk wheel, and to secure to said body a cover plate having a series of openings therein and formed with louvers for deflecting air through said openings responsive to rotation of the drum to cool the latter.

A further object is to secure to a drum of the aforesaid character a dust and moisture guard through which air flows to the drum openings.

Still another object is to journal a wheel upon an axle housing by means of a hub carried by the main body of the brake drum of said wheel, to drive said wheel from a live axle in said housing by a plate forming a closure for said drum, and to form said plate with openings admitting cooling air to the drum.

These and various other objects the invention attains by the construction hereinafter described and illustrated in the accompanying drawing, wherein:

Fig. 1 is a view in axial section of a wheel equipped with the herein-disclosed air-cooled brake drum.

Fig. 2 is a view of the same in outside elevation, with a portion of said dust and moisture guard broken away to more fully disclose openings in said drum for air admission.

Fig. 3 is a fragmentary cross section taken upon the line 3—3 of Fig. 2, showing one of said openings and an associated louver.

Fig. 4 is a sectional view, taken upon the line 4—4 of Fig. 1, showing a provision for connecting and spacing the two parts of the dust and moisture shield.

Fig. 5 is an axial sectional view of a modified drum cover plate.

In these views, the reference character 1 designates a vehicle live axle, 2 the usual housing thereof, 3 the outer portion of a disk wheel body, 4 an inner portion of said body fashioned to form the inner and peripheral walls of an outwardly opening brake drum, and 5 the rim of said wheel.

It is preferred to rigidly secure to the center portion of the drum body a hub 6, journaling the wheel on the housing 2 through a suitable antifriction bearing 7.

The outer wall of said drum is formed by a cover plate 8 attached to the wheel by bolts 9 or the like. Preferably, the disk body portion 3 inclines acutely to the central plane of rotation of the wheel as it extends outwardly to the rim (see Fig. 1). Keyed as indicated at 10 upon the outer end portion of the axle 1 is a second hub 11, which, together with the cover plate 8 forms a drive member for the wheel, said hub and plate being riveted together or otherwise rigidly connected, as indicated at 12.

For admission of a cooling current of air to the drum, a plurality of spirally elongated openings 13 are formed in the outer wall 8, in circumferentially spaced relation. Said openings are preferably formed by a stamping operation such as to leave the metal displaced from said openings integral with the wall 8 in the form of vanes or louvers 14, correspondingly inclined to the plate to deflect air through said openings, responsive to normal rotation of the wheel.

Attached to the outer face of the plate 8 by bolts 15 or the like is a stamped or spun sheet-metal guard 16 for covering the openings 13 and minimizing admission of dust and moisture thereto. Said guard is dished sufficiently to clear the louvers 14 and has a central opening accommodating the hub 11 and spaced from the latter for admission of air. Said guard further comprises a cap member 17 covering said central opening but marginally spaced from the member 16 to form a passage admitting air to said member. Preferably the member 16 is curved outwardly from the plate 8 to form said central opening and is then formed with an annular marginal flange 18 radially extending outwardly. The cap member 17 is marginally flanged radially inward, as indicated at 19, between the body of the member 16 and its flange 18, so that air in traveling to the central opening of the member 16 must circuitously pass first inward between the flange 19 and member 16, then outward between the two flanges 18 and 19 and finally inwardly through said cap. In establishing this relation, the flanges 18 and 19 may be connected by a plurality of bolts 20 and spacer sleeves 21 may be carried by said bolts and clamped between said flanges.

The air entering the drum as above described escapes through one or more openings 22 formed in the main body 4 of the drum housing 2 at some suitable point.

By thus maintaining an air flow through the brake drum while the vehicle is advancing, it is possible to form within the drum a chamber which is substantially sealed except for the air inlets and outlets, without resultant undue heating of said drum and the coacting band or shoes (not shown) when the brake is applied.

It is to be noted that the spiral form of the slots 13 and louvers 14 tends to deflect the incoming air outwardly within the drum where it may most effectively act upon the outer or peripheral portion of the drum, where the frictional heat is generated in common practice.

The opening 22 through which the air escapes is upwardly directed so that it may not readily be clogged by dirt or mud splashed upwardly from the road.

It is to be noted that the discharge of air from the brake drum through the axle housing toward the differential tends to resist travel toward the drum of any grease or other lubricant that may escape into said housing from the casing of the differential. This is of importance in that any grease entering the brake drum greatly detracts from the efficiency with which the corresponding brake functions.

While it will be apparent that the illustrated embodiment of my invention herein disclosed is well calculated to adequately fulfill the objects and advantages primarily stated, it will be understood that the invention is susceptible to variation, modification and change within the spirit and scope of the subjoined claims.

What I claim is:

1. The combination with a vehicle wheel having a brake drum with spaced side walls and formed in the outer of said walls with a plurality of air inlets, of a dust and moisture guard secured to said outer wall, covering said openings and dished to form a passage for flow of air to said openings and centrally apertured to admit air to said passage.

2. The combination with a vehicle wheel having a brake drum with spaced side walls and with a plurality of air inlets in the outer of said walls, of deflectors individually associated with said inlets to induce a flow of air into the drum responsive to rotation of the wheel, a sheet metal guard exteriorly carried by said drum and dished to form a passage leading to said inlets and having a central opening into said passage, and a cap member carried by said guard and marginally spaced from the periphery of said central opening to provide for air admission to said opening.

3. The combination set forth by claim 2, said guard being outwardly flanged marginally of said opening, and said cap member being inwardly flanged between said guard and its outturned flange to form a circuitous substantially annular air passage.

4. The combination with a vehicle live axle, of a tubular housing receiving said axle, a wheel journaled upon said housing and comprising a brake drum having air inlets, deflectors carried by said drum adjacent to said inlets for inducing a flow of air through said inlets responsive to rotation of the drum, and means establishing a drive connection to said wheel from the live axle, said tubular housing being in communication with said brake drum and forming an air outlet from said drum, and being formed with a discharge opening for such air.

5. The combination with a vehicle wheel having a brake drum and a plurality of air inlets to said drum, of means for inducing an air flow into said drum through said inlets, and a dust and moisture guard carried by said wheel exteriorly of said drum and formed with an air admission opening, said guard forming with said wheel a circuitous air passage from said opening to each of said inlets.

6. The combination with a vehicle wheel having a brake drum comprising spaced inner and outer walls and formed in one of said walls with an air inlet elongated in an approximately spiral relation to the drum axis, of a louver carried by said drum exteriorly thereof, marginal to the inner spiral edge of said inlet for directing air into the drum responsive to rotation of the drum, said louver being adapted by its spiral form to deflect such air toward the drum rim.

7. The combination with a vehicle live axle, of a tubular housing receiving said axle, a wheel journaled upon said housing and comprising a brake drum having an air inlet, a drive connection to said axle from said wheel, means for delivering air into the drum through said inlet, said tubular housing being in communication with the brake drum and forming an air outlet from said drum and being formed with a discharge opening for such air.

JENTJE MULDER.